(12) United States Patent
Izaki et al.

(10) Patent No.: US 6,526,133 B1
(45) Date of Patent: Feb. 25, 2003

(54) TELEPHONE SET FOR CONTINUOUSLY DISPLAYING CALLER TELEPHONE NUMBER BY SIMPLE OPERATION

(75) Inventors: Masahiro Izaki, Hirakata (JP); Takashi Okubo, Itami (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/381,958

(22) PCT Filed: Mar. 31, 1998

(86) PCT No.: PCT/JP98/01492

§ 371 (c)(1),
(2), (4) Date: Sep. 29, 1999

(87) PCT Pub. No.: WO98/44696

PCT Pub. Date: Oct. 8, 1998

(30) Foreign Application Priority Data

Mar. 3, 1997 (JP) .............................................. 9-081004

(51) Int. Cl.⁷ ................................................ H04M 1/56
(52) U.S. Cl. ............................... 379/142.17; 379/88.11; 379/93.17; 379/93.23; 379/142.06; 455/566; 455/415
(58) Field of Search ................................ 379/123, 127, 379/140, 142, 88.11, 93.17; 455/90, 412, 415, 566

(56) References Cited

U.S. PATENT DOCUMENTS

| | | | | |
|---|---|---|---|---|
| 4,924,496 A | * | 5/1990 | Figa et al. .................. | 379/142 |
| 4,952,927 A | * | 8/1990 | DeLuca et al. ........ | 379/825.44 |
| 5,258,748 A | * | 11/1993 | Jones ......................... | 345/172 |
| 5,737,394 A | * | 4/1998 | Anderson et al. ........ | 378/88.11 |
| 5,758,267 A | * | 5/1998 | Pinder et al. .................. | 455/90 |
| 5,774,540 A | * | 6/1998 | Davidson et al. ............. | 345/33 |
| 5,903,634 A | | 5/1999 | Wakabayashi et al. | |
| 6,021,193 A | * | 2/2000 | Thomas ...................... | 379/387 |
| 6,408,191 B1 | * | 6/2002 | Blanchard et al. .......... | 455/412 |

FOREIGN PATENT DOCUMENTS

| | | |
|---|---|---|
| JP | 59-158660 | 9/1984 |
| JP | 63-221745 | 9/1988 |
| JP | 4-344755 | 12/1992 |
| JP | 7-87178 | 3/1995 |
| JP | 7-212452 | 8/1995 |
| JP | 8-274860 | 10/1996 |

* cited by examiner

*Primary Examiner*—Curtis Kuntz
*Assistant Examiner*—Barry W. Taylor
(74) *Attorney, Agent, or Firm*—Arent Fox Kintner Plotkin & Kahn PLLC

(57) ABSTRACT

A telephone stores a plurality of pairs of data in a memory 7, each pair consisting of a caller telephone number received from a telephone number forwarding service, and the time at which the telephone number was received. In response to a first operation, a control unit 1 controls a sequential display of a first display image and a second display image by the display unit using a content of the memory 7. The first display image includes caller telephone numbers and the second display image includes other display content. In response to a second operation, the control unit 1 continuously controls the display of a first display image on the display unit using the content of memory 7 to update caller telephone numbers displayed in the first display image.

23 Claims, 11 Drawing Sheets

FIG. 2

| No. | CALLER TELEPHONE NUMBER | NAME | TIME | NEW_CALL |
|---|---|---|---|---|
| 1 | 0720—12—3456 | TARO YAMADA | 97.3.31 4:13 PM | 0 |
| 2 | 06—123—4567 | HAJIME TANAKA | 97.4.1 10:02 AM | 0 |
| 3 | 06—987—6543 | ICHIRO SATO | 97.4.1 3:14 PM | 0 |
| 4 | 0720—87—6543 | JIRO ITO | 97.4.2 1:00 PM | 1 |
| 5 | 0720—98—7654 | TOMOE UEDA | 97.4.2 2:22 PM | 1 |

TELEPHONE SET FOR CONTINUOUSLY DISPLAYING CALLER TELEPHONE NUMBER BY SIMPLE OPERATION

DESCRIPTION

A telephone that consecutively displays caller telephone numbers using a simple operation.

1. Technical Field

The present invention relates to a telephone that uses caller telephone numbers received from a telephone number forwarding service.

2. Background Art

In recent years, various features have been added to telephones, making them into sophisticated devices. At the same time, telephone companies are continually introducing new services.

One new service provided by telephone companies is the 'Telephone Number Forwarding Service'. This service, also called 'CMS' (Call Management Service) or CID (Caller ID), is a service where a telephone exchange transmits telephone numbers of callers to a telephone at the receiving end. To date, this service has already been put into practice by some telephone companies in the United States of America and Canada, and is also being implemented in Japan. This service enables telephone number data for a caller (also called CMS data), along with such information as a time and a caller name, to be transmitted as data. This takes place at a transmission rate of 1200 bits per second in an interval between the first and second rings (call signals) of an incoming call.

The telephone at the receiving end displays a telephone number on a display unit based on this data, so that a user can identify a caller before answering the call. In addition, such data can be accumulated in the telephone at the receiving end and instantly referred to by the user using the display unit.

FIG. 11 is a drawing showing display images of caller telephone numbers in a conventional telephone. This example shows a case in which caller telephone numbers, names and times for five calls are stored inside the telephone. As shown in the drawing, there are three kinds of display image: a 'standby' image, a 'name/telephone number' image and a 'time' image. The 'standby' image marks the boundary between the display information for different calls.

These display images are switched using a 'Δ' key and a '∇' key provided for use as telephone number review keys on an operating unit. In other words, each time the 'Δ' key or the '∇' key is pressed by the user, the display images change one at a time.

When using such a conventional technique however, the user needs to press a key three times in order to check a telephone number for one call, which makes user operation troublesome, particularly if many telephone numbers have been accumulated. For instance, 15 key presses are required in order to check the telephone numbers for five calls. Here, even if the nonessential 'standby' image is not displayed, two key presses are needed to change the 'name/telephone number' and 'time' images successively for one call. When many calls have been accumulated, the operation will still be troublesome for the user.

3. Disclosure of the Invention

In order to solve these problems, the present invention aims to provide a telephone that makes it possible to check caller telephone numbers and caller information transmitted from a telephone number forwarding service by means of a simple user operation.

A telephone that achieves these objectives includes the following structure. A storage unit stores a plurality of pieces of caller information transmitted by a telephone number forwarding service. An input unit receives a user input via a key press. A detecting unit detects a first operation and a second operation made into the input unit. A first display control unit controls an alternating display of a first display image and a second display image on the display unit using a content of the storage unit and in response to a first operation. The first display image includes one piece of caller information and the second display image includes other display information. A second display control unit controls continuous display of a first display image on the display unit by consecutively updating caller information displayed in the first display image using a content of the storage unit and in response to the second operation. Using this construction, troublesome key operations are unnecessary and the user can have caller information displayed consecutively. In addition, pieces of caller information can be displayed both one by one and consecutively, by using the first and second operations as required.

The telephone also includes the following structure. A storage unit stores a plurality of caller telephone numbers transmitted by a telephone number forwarding service. An input unit receives a user input via a key press. A detecting unit detects a first operation and a second operation made into the input unit. A first display control unit controls an alternating display of a first display image and a second display image on the display unit using a content of the storage unit and in response to a first operation. The first display image includes a caller telephone number and the second display image includes other display information. A second display control unit controls continuous display of a first display image on the display unit by consecutively updating caller telephone numbers displayed in the first display image using a content of the storage unit and in response to the second operation. Using this construction, troublesome key operations are unnecessary, and the user can have caller telephone numbers displayed consecutively. In addition, caller telephone numbers can be displayed both one by one and consecutively by using the first and second operations as required.

The storage unit further stores flags indicating whether a display of each caller telephone number has already been controlled by one of the first display control unit and the second display control unit. The second display control unit controls a consecutive display by the display unit of a sequence of first display images including as-yet-undisplayed caller telephone numbers, and a sequence of caller telephone numbers including already displayed caller telephone numbers. By using this structure, the telephone can display as-yet-undisplayed caller telephone numbers and already displayed caller telephone numbers separately.

The second display control unit further controls the display of a first guide display image between the display of first display images including as-yet-undisplayed caller telephone numbers and first display images including already displayed caller telephone numbers. The first guide display image indicates a boundary between the as-yet-undisplayed and already displayed first display images. If this structure is used, a user can confirm whether a first display image is as-yet-unchecked or already checked by using the first guide display image.

When all caller telephone numbers in the storage unit have been displayed, the second display control unit further displays a second guide display image indicating that all caller telephone numbers have been displayed. Using this construction, when a user can confirm whether all calls have been displayed by using a second guide image when performing continual display using the second operation.

The detecting unit includes a short press detecting unit and a long press detecting unit. The short press detecting unit detects in the input unit, as a first operation, a press of a specified key shorter than a specified time. The long press detecting unit detects that the pressing of the specified key has exceeded the specified time and, after the specified time has been exceeded, detects at fixed intervals that the specified key continues to be pressed. In this way, a first operation and a second operation can be performed by a simple operation in which a user presses a specified key for a time that is shorter or longer than a specified time.

The second display control unit further includes a display processing unit and a display updating unit. When the pressing of the specified key has been detected as exceeding the specified time, the display processing unit has a first display image including one of the caller telephone numbers stored in the storage unit displayed on a display unit. When the pressing of the specified key has been detected as continuing, the display updating unit updates the caller telephone number of the first display image with another telephone number stored in the storage unit. In this way, the telephone updates caller telephone numbers stored in the storage unit one by one at fixed intervals while the specified key continues to be pressed.

Every time a first operation is detected, the first display control unit changes one of a currently displayed first display image and second display image for another display image. In this way, a user can check a different first or second display image to the first or second display image currently being displayed by using a first operation.

The storage unit further stores names corresponding to the caller telephone numbers, and the display processing unit and display updating unit have first display images including caller telephone numbers and names corresponding to the caller telephone numbers displayed on the display unit. In this way, a user can check names corresponding to caller telephone numbers.

9. In the telephone of claim 6,* the storage unit further stores flags that indicate whether each caller telephone number has already been displayed by one of the first display control unit and the second display control unit. The second display control unit has the control unit consecutively display, with reference to the flags, as-yet-undisplayed caller telephone numbers and already displayed caller telephone numbers.

10. In the telephone of claim 9,* the second display control unit further controls a display of a guide display image between the as-yet-undisplayed and the already displayed caller telephone numbers, the guide display image indicating a boundary between the as-yet-undisplayed caller telephone numbers and the already displayed caller telephone numbers. The display control unit further controls a display of a second guide display image when all caller telephone numbers in the storage unit have been displayed, the second guide display image indicating that all caller telephone numbers have been displayed.

The parts of the sentence before each asterisk are unnecessary and should have been deleted from the Japanese.

The display updating unit includes a retrieving unit and a display updating unit. When the pressing of the specified key has been detected as continuing, the retrieving unit retrieves from the storage unit a caller telephone number stored in a storage area following a storage area of the caller telephone number currently being displayed. The display updating unit updates the caller telephone number of the first display image with the caller telephone number retrieved by the retrieving unit. In this way, the telephone updates the display of caller telephone numbers one at a time, at fixed intervals and in the order in which the numbers are stored in the storage area, while a specified key continues to be pressed.

BRIEF DESCRIPTION OF THE DRAWINGS

FIG. 2 is an example of a caller telephone table in the same embodiment;

BEST MODE FOR CARRYING OUT THE INVENTION

Construction of a Telephone

Figure 1:
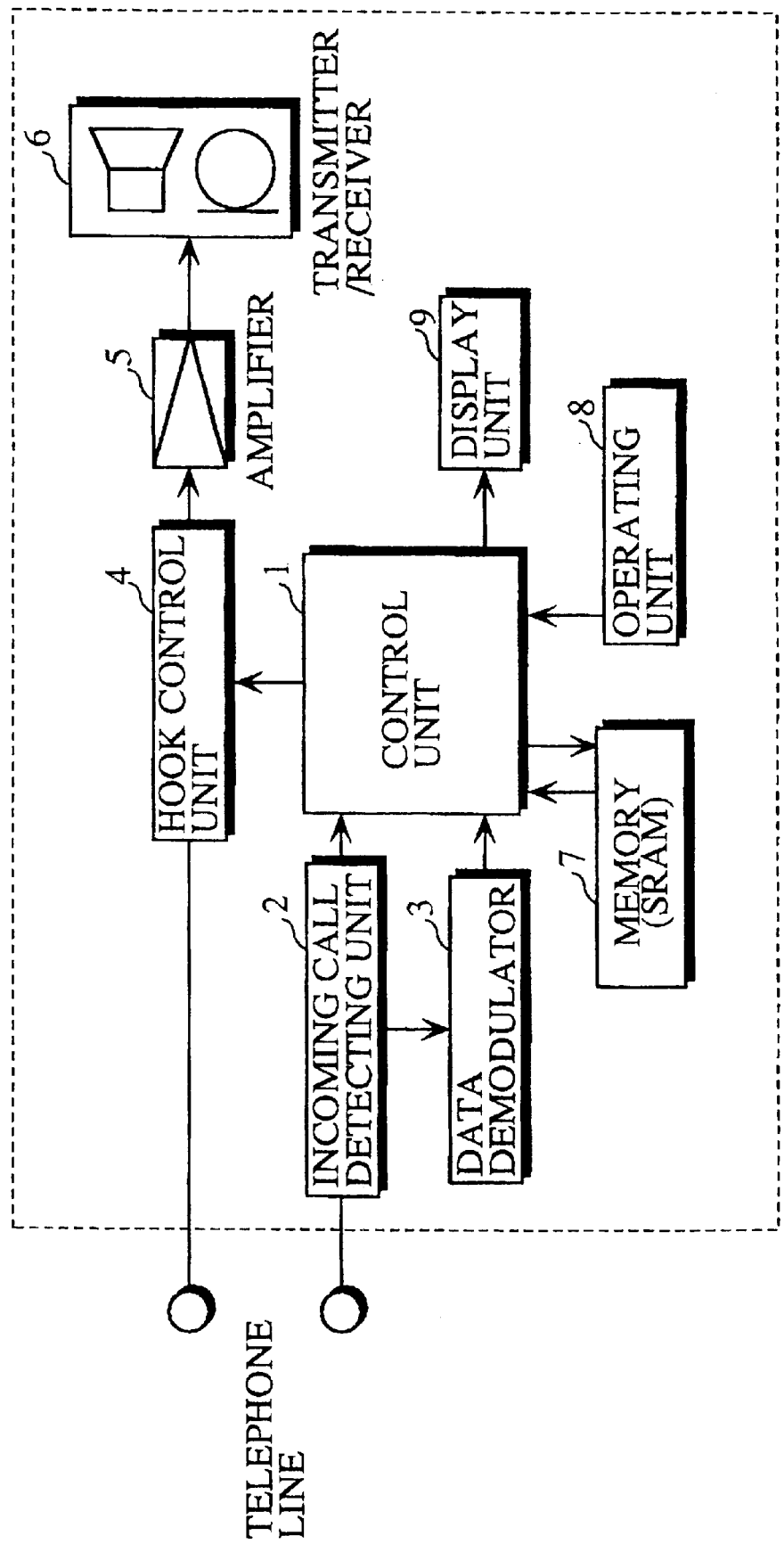
FIG. 1 is a block diagram showing a construction of a telephone in an embodiment of the present invention.

FIG. 1 is a block diagram showing a structure of a telephone in a first embodiment of the present invention. As shown in the diagram, the telephone includes an incoming call detecting unit 2, which detects call signals transmitted via a telephone line from an exchange (not shown), a data demodulator 3, which demodulates caller telephone numbers from data transmitted in the interval between the detected call signals, a hook control unit 4, which controls engaging and disconnecting operations of the telephone line in response to whether a telephone transmitter/receiver 6 is on or off the hook, an amplifier 5, which amplifies audio signals for the duration of a call after the telephone transmitter/receiver 6 has been taken off the hook, a telephone transmitter/receiver 6, composed of a microphone and a speaker, a memory 7, which stores a caller telephone number table and other data, the demodulated caller telephone numbers, and caller names being stored in the caller telephone table, an operating unit 8, which receives operating instructions from the user, a display unit 9 composed of an LCD (Liquid Crystal Display) panel or similar and a control unit 1, which controls the entire telephone. The telephone is connected to a central telephone exchange, a PBX (Private Branch Exchange) or similar via a telephone line. This exchange supports a 'Telephone Number Forwarding Service' and transmits data, including a caller telephone number, during an interval between call signals.

FIG. 2 shows an example of a caller telephone number table (hereafter shortened to table) stored in the memory 7.

As shown here, the table stores corresponding reference numbers, caller telephone numbers, caller names, times of received calls and new call flags. A new call flag is set when a new caller telephone number is recorded in the table and reset when the caller telephone number is displayed by a user operation.

In addition to keys that are normally provided on a telephone, such as the '*' key and the '#' key, the operating unit 8 includes a '∇' key and a 'Δ' key (also called the down call review key and the up call review key) that receive call review operations enabling the user to refer to caller telephone numbers held in the memory 7.

Outline of the Construction of the Control Unit 1

The control unit 1 is constructed from a microcomputer, and realizes the following functions by running programs stored in an internal ROM memory. To be exact, the control unit 1 includes a function for writing caller telephone numbers demodulated by the data demodulator 3, along with corresponding names and times, into the caller telephone number table in the memory 7. Another function of the control unit 1 displays display images including caller telephone numbers and display images including other display content, one at a time in accordance with the content of the memory 7 when a user has made a first operation using the call review keys. A further function of the control unit 1 consecutively updates the display of display images of caller telephone numbers in accordance with the content of the memory 7 when the user has made a second operation using the call review keys. Here, a first operation is where the user presses the '∇' key or the 'Δ' key on operating unit 8 for a short time, and a second operation is where the user continuously presses the '∇' key or the 'Δ' key on operating unit 8.

Figure 3:
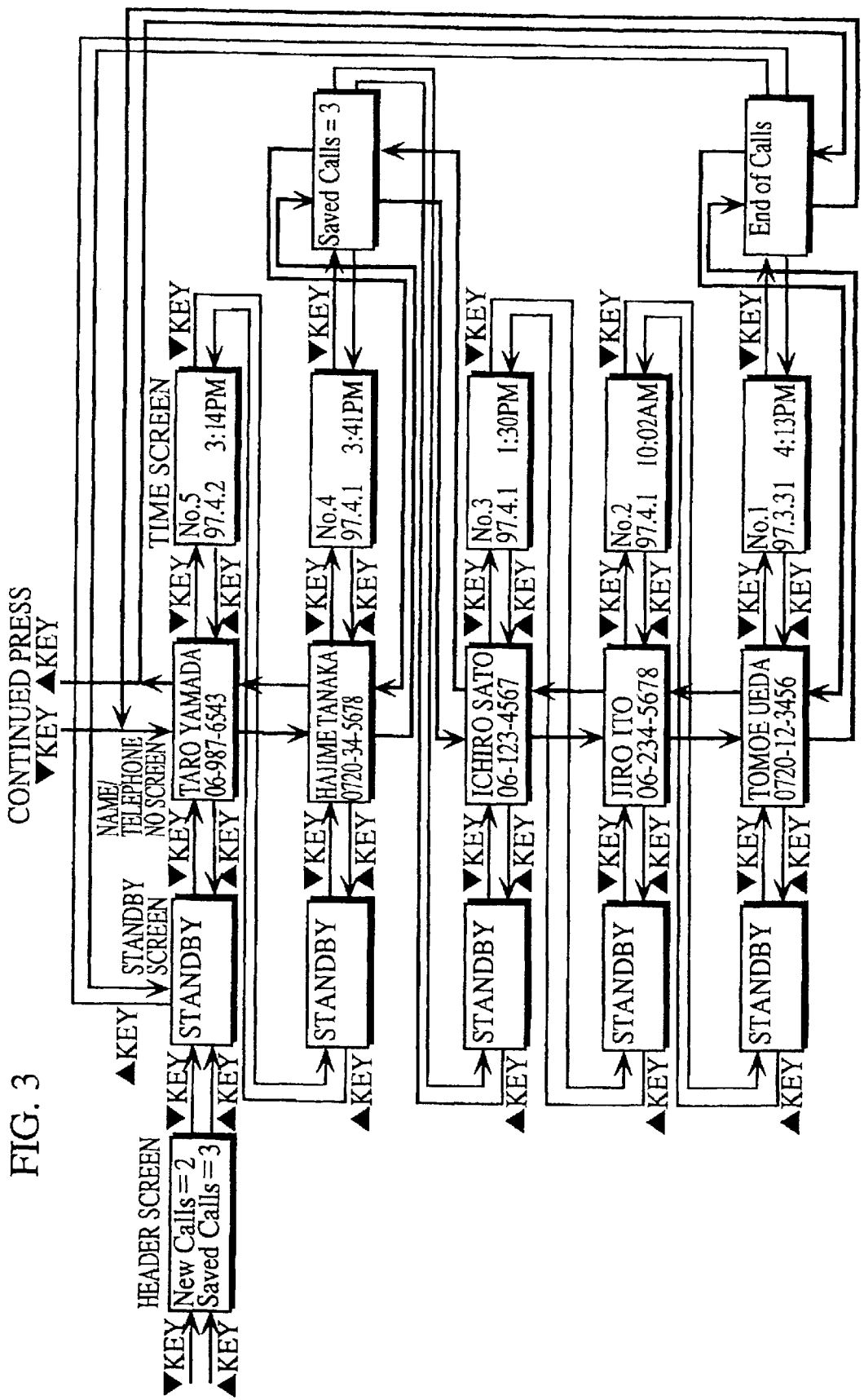
FIG. 3 is a diagram showing changes in display images performed by the first and second operations.

FIG. 3 is a diagram of the changes in the display image performed by the first and second operations.

Figure 11:
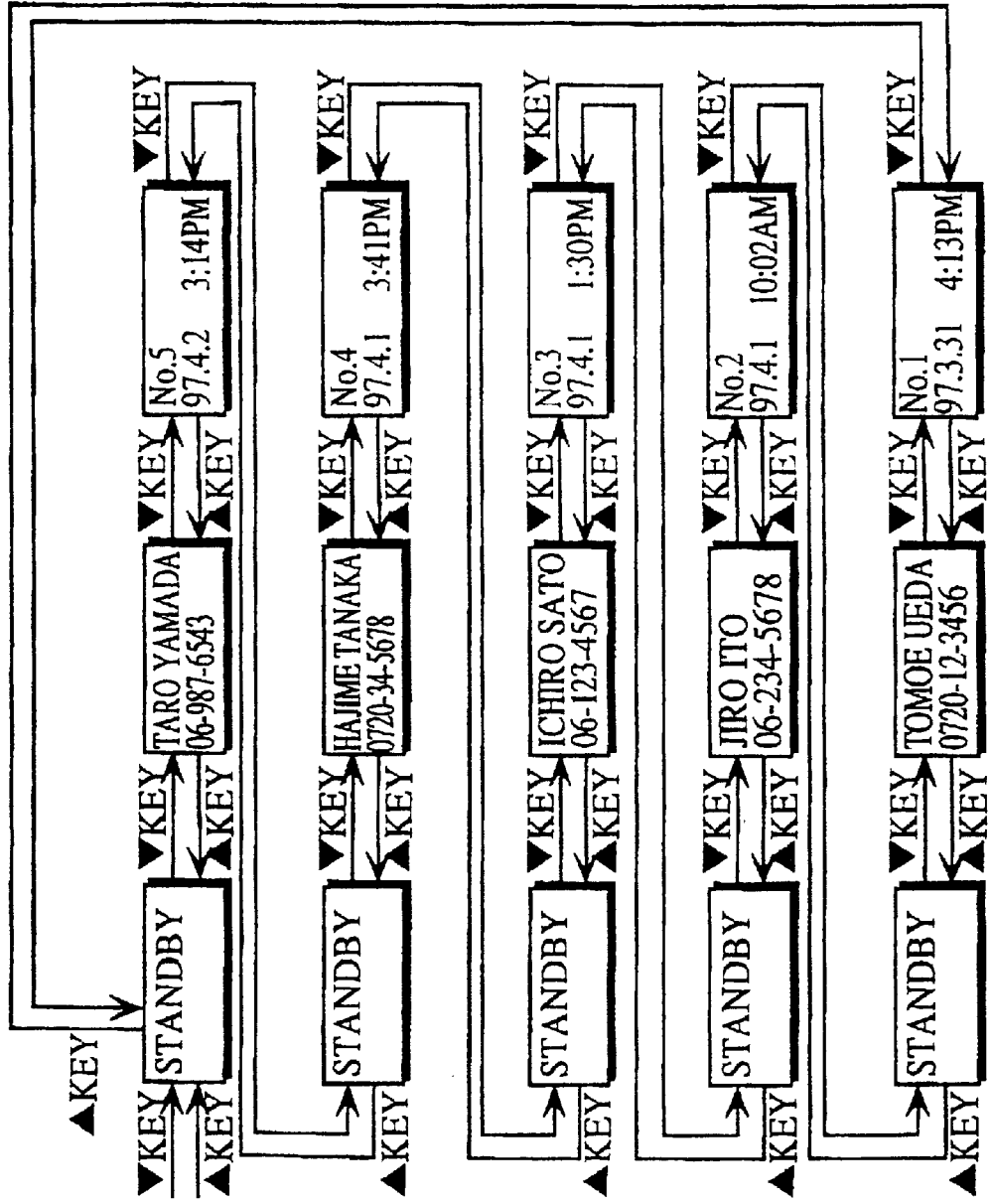
FIG. 11 is a diagram showing display images of caller telephone numbers in a conventional telephone.

Each time that a first operation, in which the '∇' key or the 'Δ' key is pressed for a short time, (hereinafter called a 'short press') takes place, the control unit 1 switches to the next display image in the order indicated by the thin arrowed lines in the diagram. When a second operation, or continuous pressing of the '∇' key or the 'Δ' key (hereinafter called a 'long press'), takes place, the control unit 1 consecutively updates the display image at approximately 0.5 second intervals in the order indicated by the thick arrowed lines in the diagram while the key is being pressed. In this diagram the header image is an image displayed by a first short press and displays a number of telephone numbers in the table that have not yet been checked by the user (New Calls) and a number of telephone numbers in the table that have been checked by the user (Saved Calls). The standby, name/telephone number and time images are those that have already been explained in FIG. 11. The 'Saved Calls' image notifies the user of the boundary between the unchecked and checked calls. The 'End of Calls' image notifies the user that the display of all the calls stored in the table has ended.

Detailed Construction of Control Unit 1

The following is a detailed explanation of the content of processing performed by the control unit 1 in response to call review operations, with reference to FIGS. 4–9.

Firstly, the flag types used by this processing are explained. The flag types are the flags KEY_PRESS, LONG_KEY_PRESS, CID_FAST, NEW_CALLS and the counter KEY_TIMER. These flag types show the current state of the processing.

The KEY_PRESS flag shows whether a key is continuously being pressed.

The LONG_KEY_PRESS flag shows whether the time for which the key is continuously pressed exceeds approximately one second. This means that a second operation (a long press of a call review key) has occurred.

The KEY_TIMER counter is the kind of counter used by a software timer and counts down one every 20 milliseconds. This counter is used to count for approximately one second from the moment the key is pressed (20 milliseconds×50 cycles) and, after one second has passed, to count at intervals of approximately 0.5 seconds (20 milliseconds×25 cycles).

If a second operation is performed, the CID_FAST flag shows whether the display mode in which the display image is consecutively updated at approximately 0.5 second intervals (hereinafter called the fast forward mode) is taking place.

The NEW_CALLS flag shows whether data that has not yet been checked by the user is being displayed.

Figure 4:
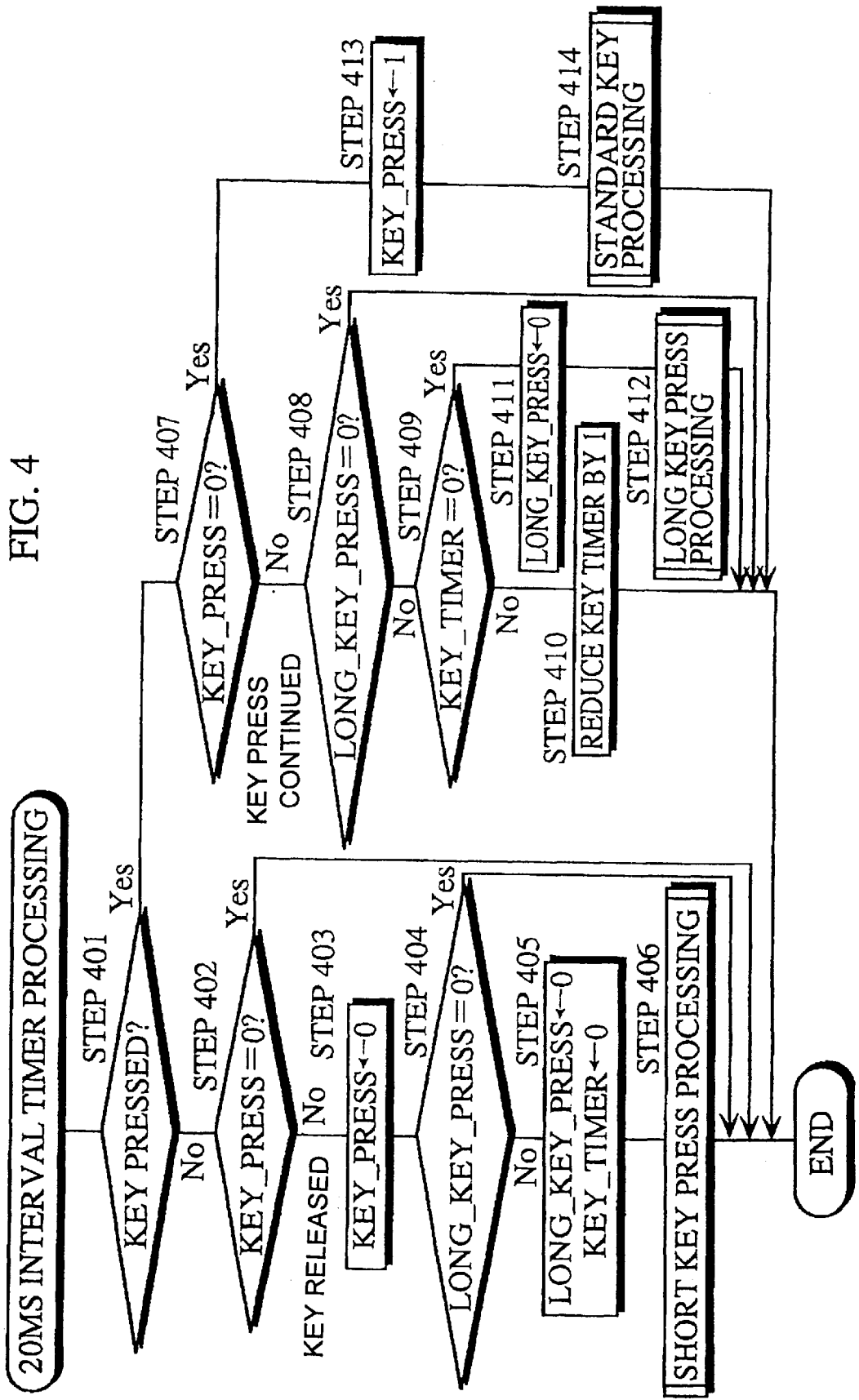
FIG. 4 shows a processing flow for a control unit 1, which monitors key input from an operating unit 8.

FIG. 4 shows a processing flow of the control unit 1 that monitors key input from the operating unit 8. The control unit 1 receives a timer interrupt every 20 milliseconds and monitors the status of key input via an interrupt process, as described below.

As shown in the diagram, the control unit 1 performs standard key processing when a key is pressed (Steps 401, 407, 413, 414).

Furthermore, while a key is continuously being pressed, the control unit causes the KEY_TIMER counter to count down (Steps 407–410). When one second has passed and thereafter when each 0.5 second interval has passed (Steps 409, 411), the control unit 1 performs the long key press processing (Step 412). When a key is released (Steps 403–405), the control unit performs short key press processing (Step 406).

Figure 5:
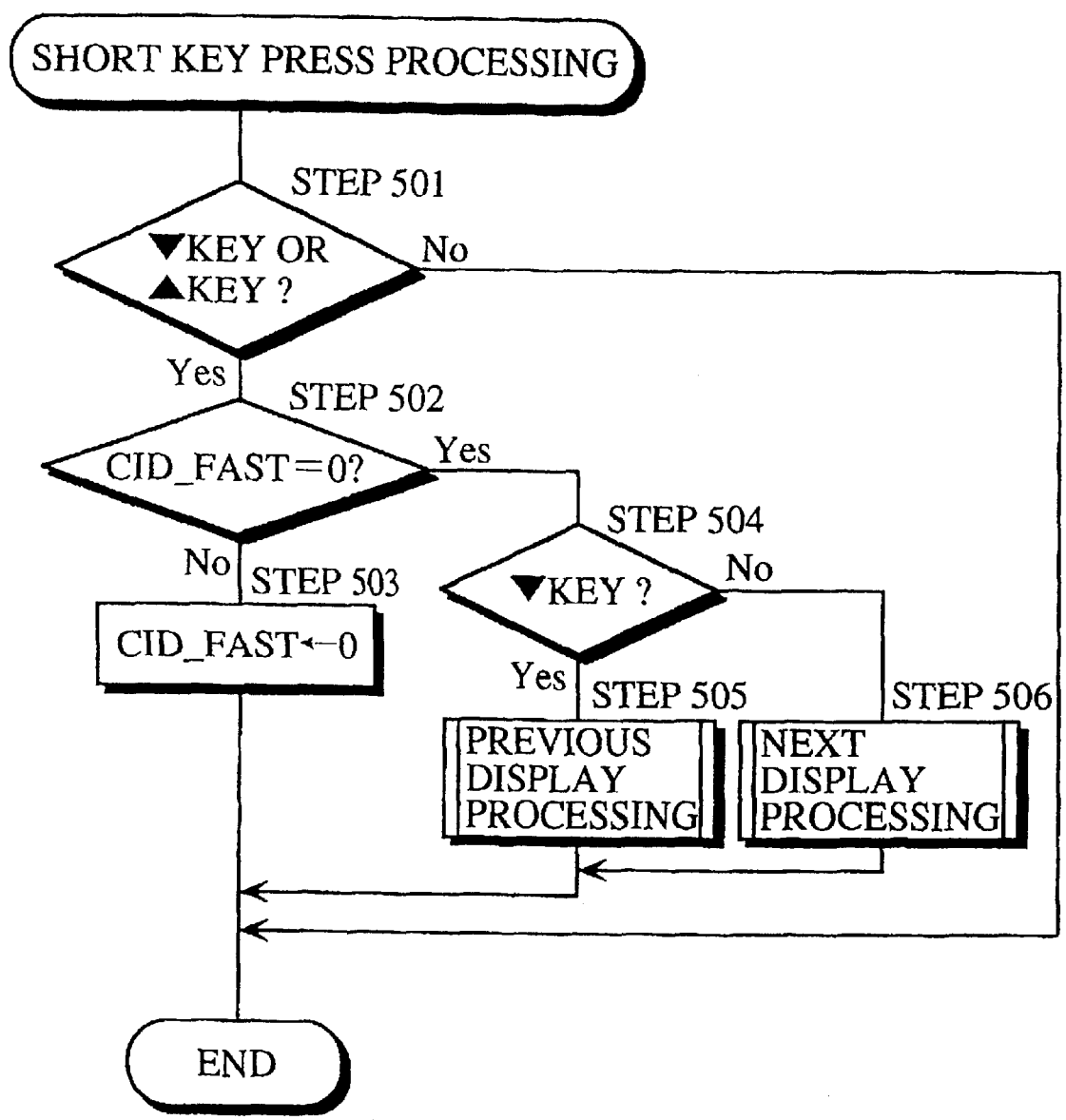
FIG. 5 shows a more detailed flowchart of processing for a short key press in FIG. 4.

FIG. 5 shows a more detailed flowchart for the short key press processing in FIG. 4 (Step 406). In the short key press processing, if the fast forward mode is not in operation when the '∇' key or the 'Δ' key is released (Step 501, 502: yes), the control unit 1 performs previous display processing for the '∇' key and next display processing for the 'Δ' key (Steps 504–506). This previous display processing and next display processing for the short key press change the display to a next image, illustrated by the thin arrowed lines in FIG. 3.

Here, if the fast forward mode is in operation when the '∇' key or the 'Δ' key is released (Steps 501, 502: no), the control unit 1 cancels the fast forward mode (Step 503).

Figure 6:
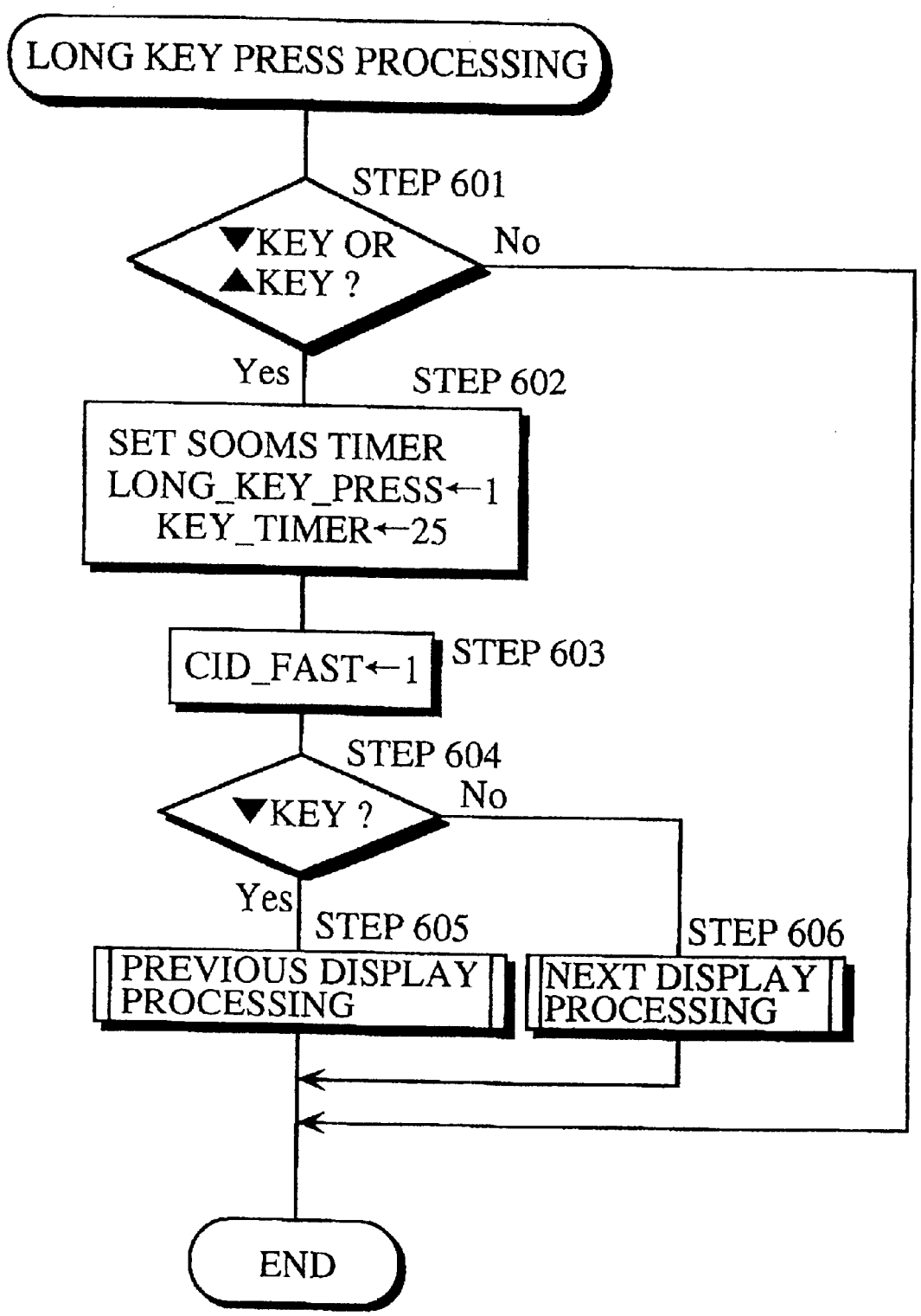
FIG. 6 shows a more detailed flowchart of processing for a long key press in FIG. 4.

FIG. 6 shows a more detailed flowchart of the long key press processing (step 412) in FIG. 4. In the long key press processing, if the '∇' key or the 'Δ' key is pressed (Step 601), the control unit 1 sets a 500-millisecond software timer (Step 602), sets the fast forward mode (Step 603) and performs previous display processing for the '∇' key and next display processing for the 'Δ' key (Steps 604–606). This previous display processing and next display processing for the long key press change the display to a next image, as illustrated by the thick arrowed lines in FIG. 3. While a key continues to be pressed, the processing of FIG. 6 takes place every 500 milliseconds, so that the image display is consecutively updated at 500-millisecond intervals.

Figure 7:
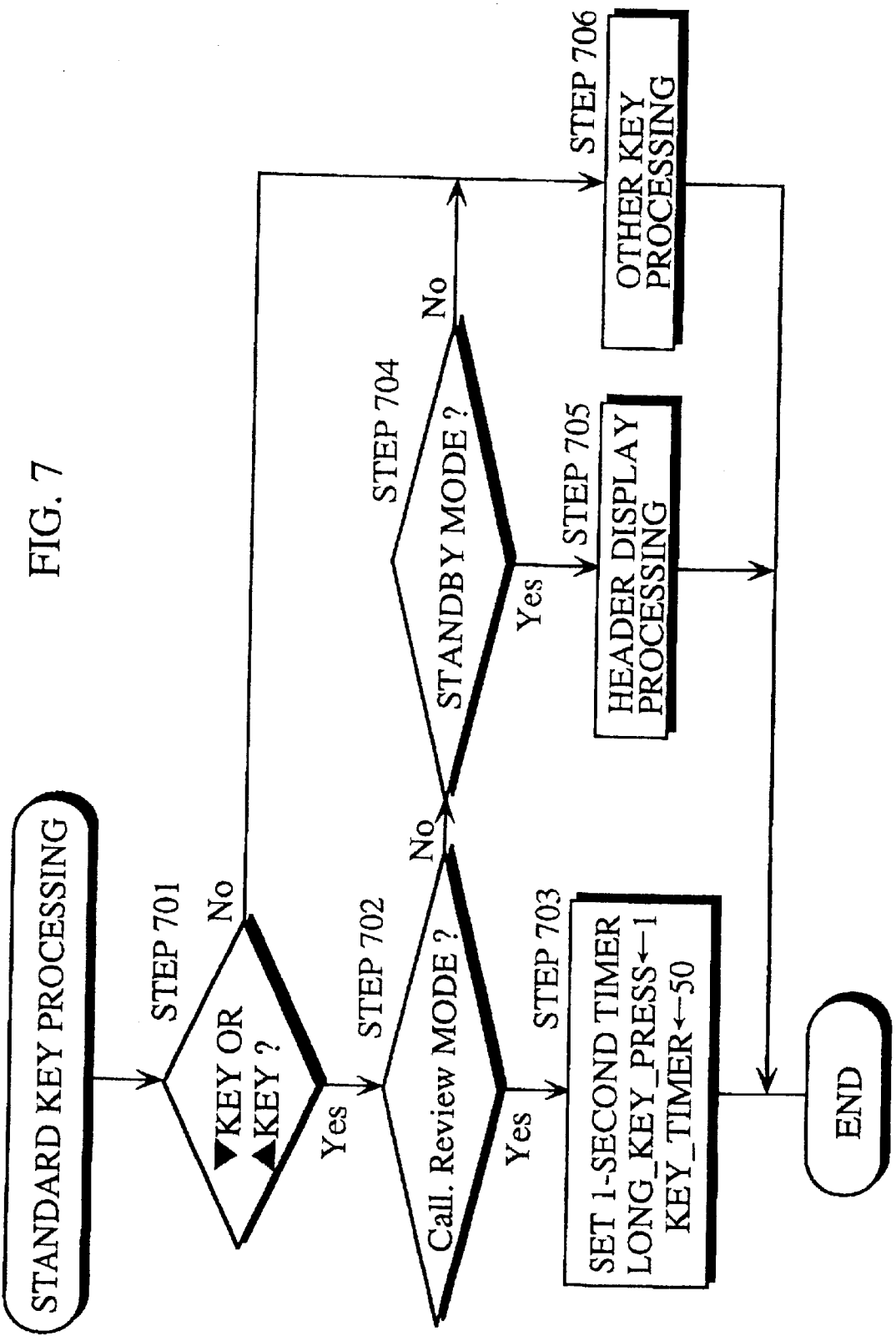
FIG. 7 shows a more detailed flowchart of standard key processing in FIG. 4.

FIG. 7 shows a more detailed flowchart of the standard key processing (Step 414) of FIG. 4. In the standard key processing that takes place when a key is pressed, if the '∇' key or the 'Δ' key is pressed (Step 701) and the call review mode in operation, the control unit 1 sets a one-second software timer (Step 702, 703). If the standby mode is in operation, the control unit 1 causes a header image to be displayed (Step 704, 705. Here, call review mode is a state in which the telephone has already begun to refer to telephone numbers in the table. Standby mode is an idle state during which operations such as those for transmitting and receiving calls and for call review can be received. If the telephone is not in standby mode (eg. A call is being made) other key processing takes place (Step 706).

Figure 8:
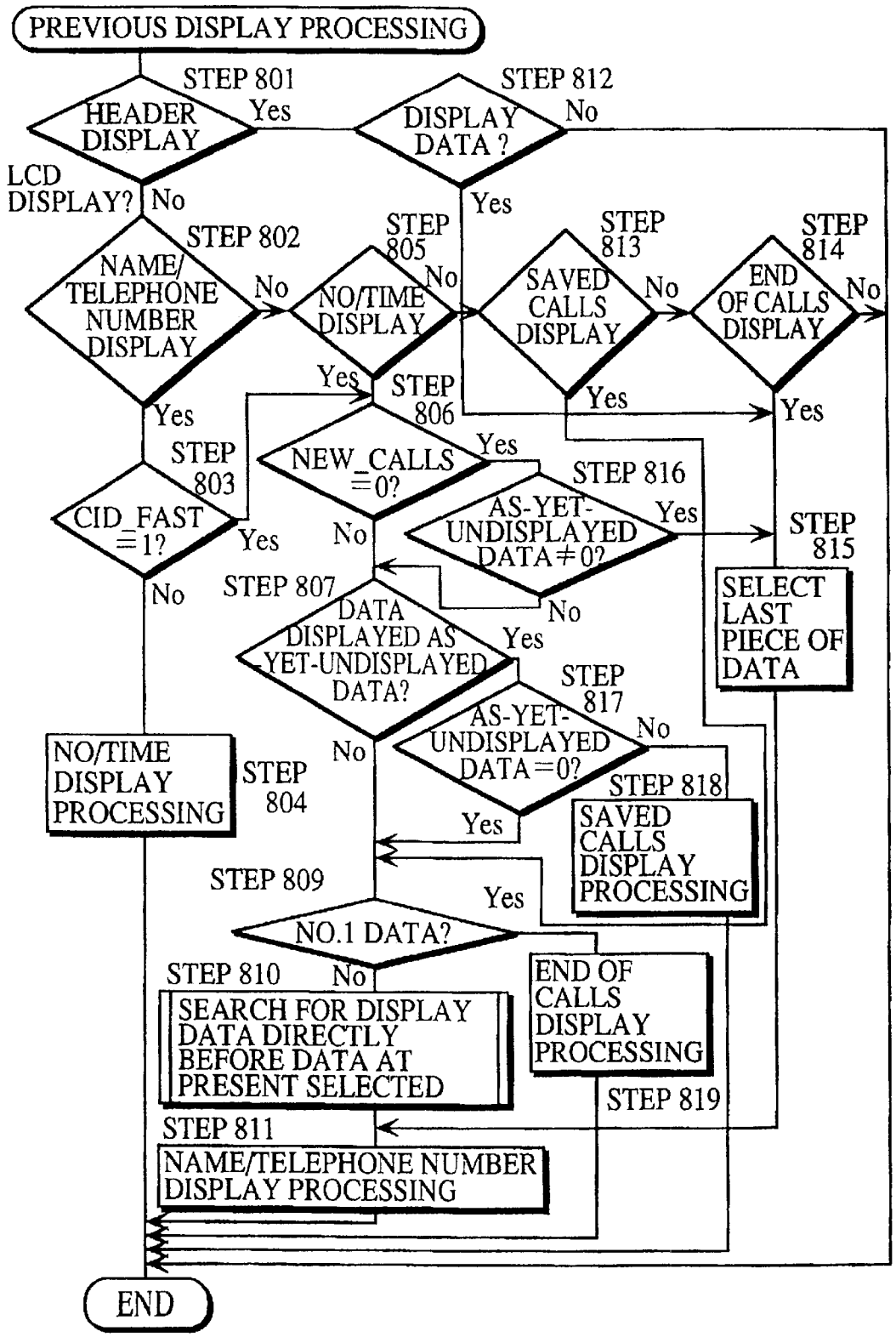
FIG. 8 shows a more detailed flowchart of previous display processing in FIGS. 5 and 6.

FIG. 8 shows a more detailed flowchart of the previous display processing that takes place in the case of a long '∇' key press (FIG. 6, Step 605) and in the case of a short '∇' key press (FIG. 5, Step 505). The drawing uses the same flow to represent the processing for both the long key press and the short key press. Here, the standby image (not shown) is nonessential and so is omitted from the diagram.

For a long key press, the processing to update a name/telephone image once every 0.5 seconds takes place according to the flow in this diagram. Specifically, the control unit 1 selects the last data, in other words the newest data in the table, as a first display for a long key press (Steps 801→812→815, or Steps 801–803→806→816→815, or Steps 801→802→805→806→816→815) and displays a name/telephone number image (Step 811). From a second display for a long key press onwards, if there is no as-yet-undisplayed data remaining, the control unit 1 displays the 'Saved Calls' image is (Steps 801–803→806→807→817→818) and when all of the data has been displayed the control unit 1 displays the 'End of Calls' image (Steps 801→802→806→807→809→819).

By this kind of processing, when the '∇' key continues to be pressed, name/telephone images are consecutively updated every 0.5 seconds in the order shown by the thick arrowed lines in FIG. 3.

In the case of a short key press, if the current display image is a name/telephone number image, the control unit 1 switches to a time image (Steps 801–804). If the current display image is a time image, the control unit 1 switches to a name/telephone number image (Steps 801→802→806 . . . 810→811). However, when a time image is displayed and there is no as-yet-undisplayed data remaining, the control unit 1 displays the 'Saved Calls' image (Steps 807→817→818), and when all of the data has been displayed, the control unit 1 displays the 'End of Calls' image (Steps 807→809→819). The display for a short key press is the same as in the related art.

Figure 9:
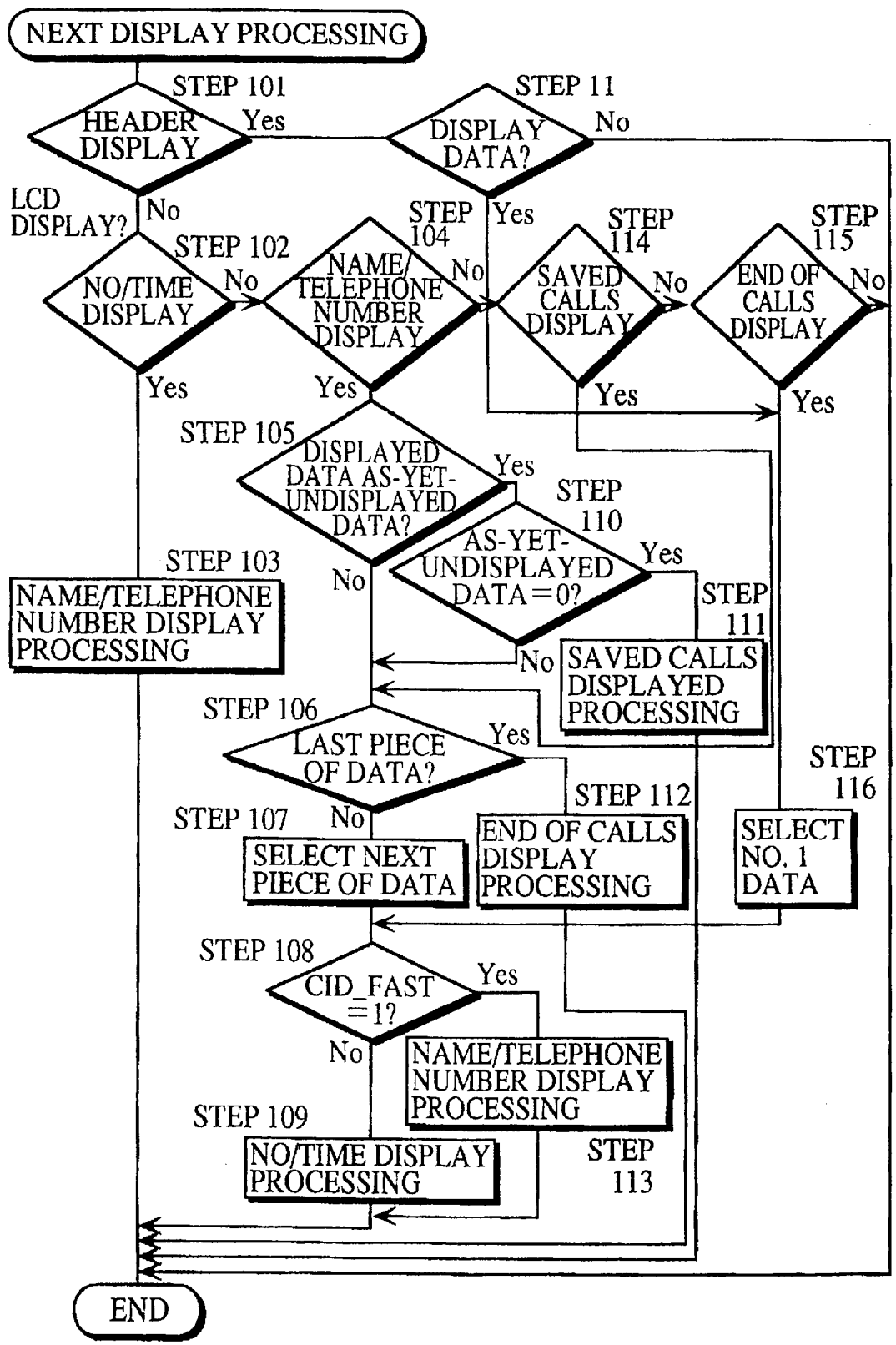
FIG. 9 shows a more detailed flowchart of next display processing in FIGS. 5 and 6.

FIG. 9 is a more detailed flowchart showing the next display processing when a long press of the 'Δ' key is made (FIG. 6, Step 606) or when a short press of the 'Δ' key is made (FIG. 5, Step 506). In this drawing, the processing for a long press and a short press are illustrated using the same flowchart. It should be noted that since a standby image is not essential, processing for this is omitted from the flowchart and it is not displayed.

In the case of a long key press, a name/telephone image is updated every 0.5 seconds by means of the processing shown in FIG. 9. Specifically, the control unit 1 selects the data at the top of the table, in other words the oldest data, as the first display for a long key press (Steps 101→117→116, or Steps 101→102→104→114→115), and displays a time image (Step 109). From the second display for a long key press onwards the control unit 1 displays the 'Saved Calls' image if there is no as-yet-undisplayed data (Steps 101→102→104→105→110→111) and the 'End of Calls' image if all of the data has been displayed (Steps 101→102→104→106→112).

If the 'Δ' key continues to be pressed the name/telephone number image is updated consecutively every 0.5 seconds using the above processing, in the order shown by the thick arrowed lines in FIG. 3.

In the case of a short key press, if the current display image is a time image the control unit 1 switches to a name/telephone number image (Steps 101–103). If the current display image is a time image, the control unit 1 switches to a name/telephone number image *(Steps 101→102→104 . . . 108→109). However, if a time image is being displayed, and there is no as-yet-undisplayed data, the control unit 1 displays the 'Saved Calls' image (Steps 105→110→111), and if all the data has been displayed, the control unit 1 displays the undisplayed 'End of Calls' image (Steps 104→105→106→112). The display in the case of a short key press is the same as in the related art.

* Here the order of the sentence should be reversed so that it reads 'If the current display image is a name/telephone number image the control unit 1 switches to a time image . . . '.

The following is an explanation of the overall operation of an embodiment of a telephone with the construction described above.

If the user makes a second operation, that is, a long press of the '∇' or the 'Δ' key in which the key is pressed for one second or more, the control unit 1 consecutively updates the display of a display image every 0.5 seconds in the order shown by the thick arrowed lines in FIG. 3. During this time, the number of telephone numbers in the table as yet unchecked by the user ('New Calls=' display) and the number of telephone numbers in the table already checked by the user ('Saved Calls=' display) are inserted. Here, a standby image need not be displayed.

Figure 10:
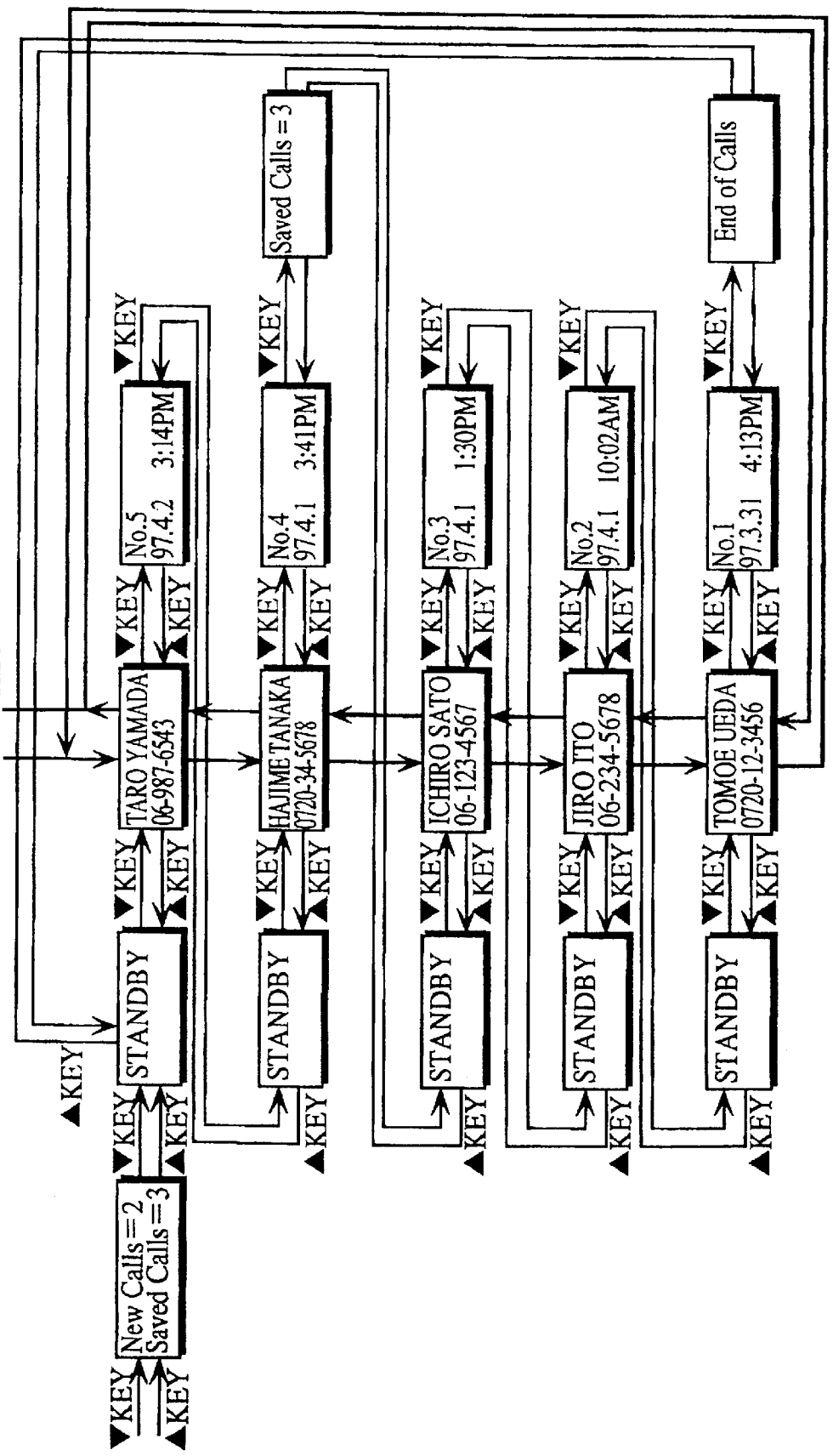
FIG. 10 is a diagram showing other display image changes performed by the first and second operations.

It should be noted that the 'Saved Calls' image and 'End of Calls' image need not be displayed as shown in FIG. 10. In this case, Step 818 in FIG. 8 may be deleted and the flow altered so that it progresses from Step 817 to Step 811, while Step 819 may be deleted and the flow altered so that it progresses from Step 809 to Step 811. In FIG. 9, Step 111 may be deleted and the flow altered so that it progresses from Step 110 to Step 109, while Step 819 may be deleted and the flow altered so that it progresses from Step 809 to Step 811.*

*The steps described in the later part of this sentence are incorrectly labeled in the Japanese and should refer to FIG. 9, not FIG. 8.

Furthermore, in FIG. 3, if a standby image is to be displayed by a short key press, when the display shows a time image, a name/telephone number image may be displayed immediately following the standby image by one short press of the '∇' key. In the same way, one short press of the 'Δ' key when a name/telephone number image is being displayed may be used to display a time image immediately following the standby image.

Furthermore, in the embodiment described above it is assumed that the data transmitted by a telephone number forwarding service includes telephone numbers and names of callers, but the following method is also possible. Here, in the data from the telephone number service a code identifying the caller may be transmitted as caller information rather than a telephone number and name. In this case, such a code may be stored in the caller telephone number table of the above embodiment instead of caller telephone numbers. Here, a code image (an actual code or an image that represents the meaning of a code) may be displayed instead of a name/telephone image.

Furthermore, corresponding 'code', 'name', 'telephone number', 'call time' data and the like may be stored in the caller telephone number table, and when a user executes a first operation images may be displayed in the following order: code/name image, telephone number image, time image.

Here, in addition to codes, telephone numbers and the like, a message from a caller may also be received and stored in the table as caller information and a message image displayed in response to a first operation.

This telephone is constructed so that when a second operation is received, name/telephone number images are consecutively displayed, but other data stored in the table apart from name/telephone numbers, such as code images, message images or time images, may also be consecutively displayed. For example, in FIG. 3, if a first operation is received after name/telephone number images have been consecutively displayed by a second operation, the time image corresponding to the name/telephone number image displayed at that time may be displayed. Then, if the second operation is received, time images may be consecutively displayed.

INDUSTRIAL APPLICABILITY

As described above, the telephone of the present invention serves a useful purpose as a telephone that displays caller telephone numbers transmitted by a telephone number forwarding service using a simple user operation. This is particularly effective when many caller telephone numbers have been accumulated.

What is claimed is:

1. A telephone that receives caller information from a telephone number forwarding service and displays the caller information on a display unit, wherein the telephone comprises:

a storage means for storing a plurality of pieces of caller information transmitted by the telephone number forwarding service;

an input means for receiving a user input via a key press;

a detecting means for detecting a first operation and a second operation made to a predetermined key of the input means;

first display control means for controlling an alternating display of a first display image and a second display image on the display unit in response to the first operation, the first display image being one of the plurality of pieces of caller information stored in the storage means and the second display image being a display content corresponding to the piece of caller information displayed as the first display image; and a second display control means for controlling a continuous display of the first display image on the display unit by consecutively updating caller information displayed in the first display image at fixed time intervals using a content of the storage means and in response to the second operation.

2. A telephone that receives caller telephone numbers from a telephone number forwarding service and displays the caller telephone numbers on a display unit, wherein the telephone comprises:

a storage means for storing a plurality of caller telephone numbers transmitted by the telephone number forwarding service;

an input means for receiving a user input via a key press;

a detecting means for detecting a first operation and a second operation made to a predetermined key of the input means;

a first control means for controlling an alternating display of a first display image and a second display image on the display unit in response to the first operation, the first display image being one of the plurality of caller telephone numbers stored in the storage means and the second display image being a display content corresponding to the caller telephone number displayed as the first display image; and a second display control means for controlling a continuous display of the first display image on the display unit by consecutively updating caller telephone numbers displayed in the first display image at fixed time intervals using a content of the storage means and in response to the second operation.

3. The telephone of claim 2, wherein the storage means further stores flags indicating whether a display of each caller telephone number has already been controlled by one of the first display control means and the second display control means;

and wherein the second display control means controls a consecutive display by the display unit of a sequence of first display images including as-yet undisplayed caller telephone numbers, and a sequence of caller telephone numbers including already displayed caller telephone numbers.

4. The telephone of claim 3, wherein the second display control means further controls a display of a first guide display image between the display of first display images including as-yet-undisplayed caller telephone numbers and first display images including already displayed caller telephone numbers, the first guide display image indicating a boundary between the as-yet-undisplayed and already displayed first display images.

5. The telephone of claim 4, wherein, when all caller telephone numbers in the storage means have been displayed, the second display control means further controls a display of a second guide display image indicating that all caller telephone numbers have been displayed.

6. The telephone of claim 2, wherein the detecting means includes:

a short press detecting unit that, as the first operation, detects in the input means a press of a specified key shorter than a specified time; and a long press detecting unit, that detects whether the pressing of the specified key has exceeded the specified time and, after the specified time has been exceeded, detects at fixed intervals whether the specified key continues to be pressed.

7. The telephone of claim 6, wherein the second display control means further includes:

a display processing unit that, when the pressing of the specified key has been detected as exceeding the specified time, has a first display image including one of the caller telephone numbers stored in the storage means displayed on the display unit; and a display updating unit that, when the pressing of the specified key has been detected as continuing, updates the caller telephone number of the first display image with another telephone number stored in the storage means.

8. The telephone of claim 7, wherein, every time a first operation is detected, the first display control means changes one of a first display image and a second display image currently being displayed to another display image.

9. The telephone of claim 7, wherein the storage means further stores names corresponding to the caller telephone numbers, and the display processing unit and display updating unit have a first display image displayed on the display unit, the first display image including a caller telephone number and a name corresponding to the caller telephone number.

10. The telephone of claim 7, wherein the storage means further stores flags indicating whether a display of each caller telephone number has already been controlled by one of the first display control means and the second display control means; and the second display control means controls a consecutive display of a sequence of as-yet-undisplayed caller telephone numbers and a sequence of already displayed caller telephone numbers on the display unit with reference to the flags.

11. The telephone of claim 10, wherein the second display control means further controls a display of a guide display image between the as-yet-undisplayed and the already displayed caller telephone numbers, the guide display image indicating a boundary between the as-yet-undisplayed caller telephone numbers and the already displayed caller telephone numbers, and controls a display of a second guide display image when all caller telephone numbers in the storage means have been displayed, the second guide display image indicating that all caller telephone numbers have been displayed.

12. The telephone of claim 7, wherein the display updating unit includes:

a retrieving unit that, when the pressing of the specified key has been detected as continuing, retrieves from the storage means a caller telephone number stored in a storage area following a storage area of the caller telephone number currently being displayed and;

a display updating unit, that updates the caller telephone number of the first display image with the caller telephone number retrieved by the retrieving unit.

13. A telephone that receives caller telephone numbers from a telephone number forwarding service and displays the caller telephone numbers on a display unit, wherein the telephone comprises:

a storage means, for storing a plurality of sets of data, each set including a caller telephone number received from the telephone number forwarding service and a time at which the telephone number was received;

an input means, for receiving a user input made via a key press;

a detecting means, for detecting a first operation and a second operation made to a predetermined key of the input means;

a first display control means for controlling an alternating display of a first display image and a second display image on the display unit in response to a first operation, wherein the first display image being one of the plurality of caller telephone numbers stored in the storage means and the second display image being a reception time corresponding to the caller telephone number displayed as the first display image; and a second display control means for controlling a continuous display of the first display image on the display unit by consecutively updating caller telephone numbers displayed in the first display image at fixed time intervals using a content of the storage means and in response to the second operation.

14. The telephone of claim 13, wherein the storage means further stores flags indicating whether a display of each caller telephone number has already been controlled by one of the first display control means and the second display control means, and the second display control means controls a continuous display by the display unit of a sequence of first display images including as-yet-undisplayed caller telephone numbers and a sequence of caller telephone numbers including already displayed caller telephone numbers with reference to the flags.

15. The telephone of claim 14, wherein the second display control means further controls a display of a first guide display image between first display images including as-yet-undisplayed caller telephone numbers and first display images including already displayed caller telephone numbers, the first guide display image indicating a boundary between as-yet-undisplayed and already displayed first display images.

16. The telephone of claim 15, wherein, when all caller telephone numbers in the storage means have been displayed, the second display control means further controls a display of a second guide display image, the second guide display image indicating that all caller telephone numbers have been displayed.

17. The telephone of claim 16, wherein the display updating unit includes:

a retrieving unit that, when the pressing of the specified key has been detected as continuing, retrieves from the storage means a caller telephone number stored in a storage area following a storage area of the caller telephone number currently being displayed; and a display updating unit, that updates a caller telephone number of the first display image with the caller telephone number retrieved by the retrieving unit.

18. The telephone of claim 13, wherein the detecting means includes:

a short press detecting unit that, as the first operation, detects in the input means a press of a specified key shorter than a specified time and;

a long press detecting unit that detects whether the pressing of the specified key has exceeded the specified time and, after the specified time has been exceeded, detects at fixed intervals whether the specified key continues to be pressed.

19. The telephone of claim 18, wherein the storage means further stores names corresponding to the caller telephone numbers, and the display processing unit and display updating unit have first display images, each including a caller telephone number and a name corresponding to the caller telephone number, displayed on the display unit.

20. The telephone of claim 18, wherein the second display control means includes:

a display processing unit that, when the pressing of the specified key has been detected as exceeding the specified time, has a first display image including one of the caller telephone numbers stored in the storage means displayed on the display unit;

a display updating unit that, when the pressing of the specified key has been detected as continuing, updates the caller telephone number of the first display image with another telephone number stored in the storage means.

21. The telephone of claim 20, wherein, each time the first operation is detected, one of a first display image and a second display image currently being displayed is changed to another display image.

22. The telephone of claim 20, wherein the storage means further stores flags that indicate whether a display of each caller telephone number by the display unit has already been controlled by one of the first display control means and the second display control means;

and the second display control means controls a consecutive display of a sequence of as-yet-undisplayed caller telephone numbers and a sequence of already displayed caller telephone numbers on the display unit with reference to the flags.

23. The telephone of claim 20, wherein the second display control means further controls a display of a guide display image between the as-yet-undisplayed and the already displayed caller telephone numbers, the guide display image indicating a boundary between the as-yet-undisplayed and the already displayed caller telephone numbers, and controls a display of a second guide image when all caller telephone numbers in the storage means have been displayed, the second guide image indicating that all caller telephone numbers have been displayed.

* * * * *